(12) United States Patent
Peters

(10) Patent No.: US 9,838,087 B2
(45) Date of Patent: *Dec. 5, 2017

(54) MOBILE PROXIMITY COUPLING DEVICE

(71) Applicant: BUNDESDRUCKEREI GMBH, Berlin (DE)

(72) Inventor: Florian Peters, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/785,577

(22) PCT Filed: Mar. 28, 2014

(86) PCT No.: PCT/EP2014/056313
§ 371 (c)(1),
(2) Date: Oct. 19, 2015

(87) PCT Pub. No.: WO2014/173627
PCT Pub. Date: Oct. 30, 2014

(65) Prior Publication Data
US 2016/0072555 A1 Mar. 10, 2016

(30) Foreign Application Priority Data
Apr. 23, 2013 (EP) ..................................... 13164818

(51) Int. Cl.
*H04B 5/00* (2006.01)
*G06K 7/00* (2006.01)
(Continued)

(52) U.S. Cl.
CPC ......... *H04B 5/0075* (2013.01); *G06K 7/0008* (2013.01); *G06K 7/10158* (2013.01); *G06K 7/10297* (2013.01); *H04B 5/02* (2013.01)

(58) Field of Classification Search
CPC combination set(s) only.
See application file for complete search history.

(56) References Cited

U.S. PATENT DOCUMENTS 6,693,511 B1 * 2/2004 Seal .......................... G01S 5/10
340/10.1
2004/0077383 A1 * 4/2004 Lappetelainen .. H04W 52/0229
455/574

(Continued)

OTHER PUBLICATIONS

International Search Report mailed Jun. 10, 2014 issued on PCT Patent Application No. PCT/EP2014/056313 dated Mar. 28, 2014, European Patent Office.

*Primary Examiner* — Cindy Trandai
(74) *Attorney, Agent, or Firm* — Mannava & Kang, P.C.; Arash Behravesh

(57) ABSTRACT

The invention relates to a mobile proximity coupling device (100) for inductive coupling with an integrated circuit of a proximity object, the integrated circuit comprising a coupling interface for inductive coupling, the proximity coupling device (100) comprising a contactless interface (107) being configured to inductively transmit a first number of commands towards the integrated circuit, and, after transmitting a respective command, to wait for a reception of a dedicated answer to the respective command from the integrated circuit within a predetermined time interval; and a processor (109) being configured to determine a quality indicator upon the basis of a second number of received dedicated answers to the first number of commands, the quality indicator indicating a quality of an inductive coupling between the contactless interface and the coupling interface of the integrated circuit.

19 Claims, 3 Drawing Sheets

Figure 1:
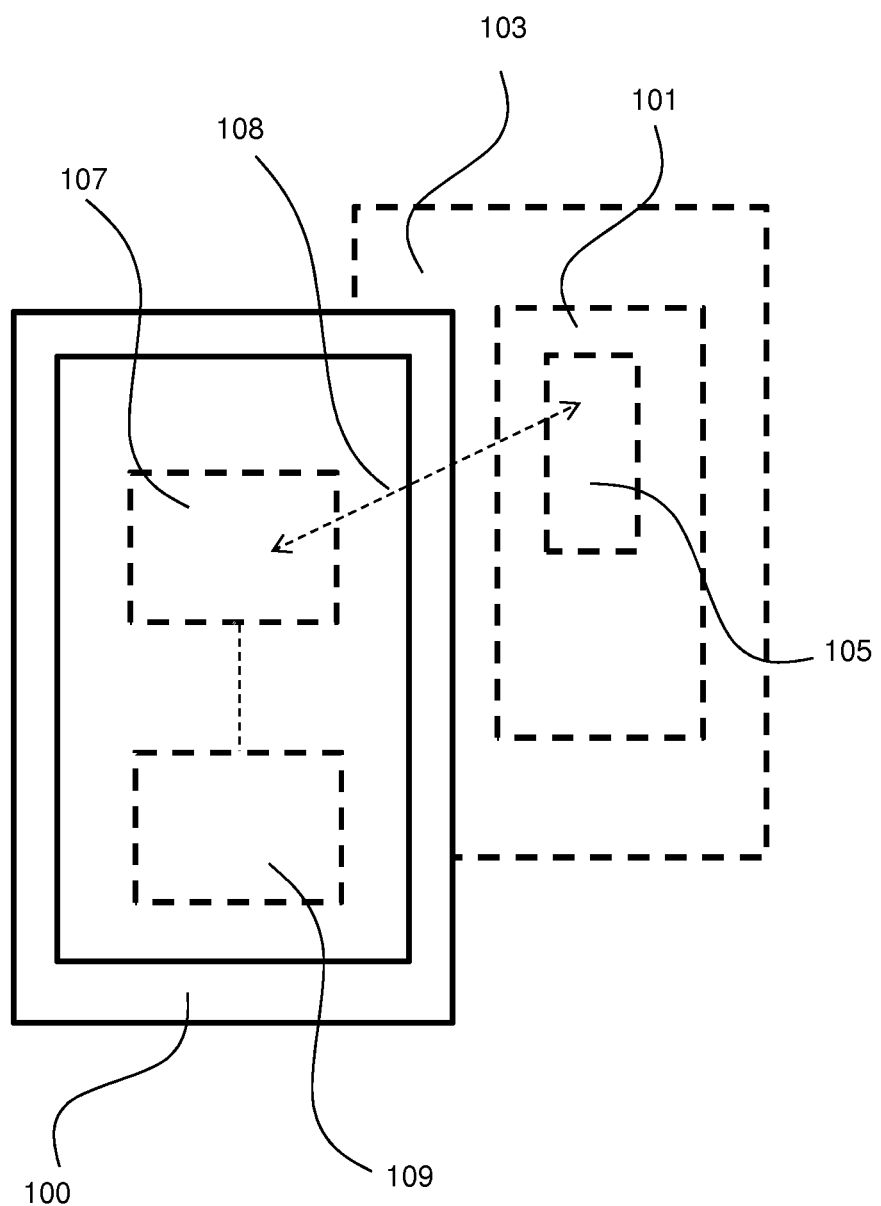

(51) Int. Cl.
*G06K 7/10* (2006.01)
*H04B 5/02* (2006.01)

(56) References Cited

U.S. PATENT DOCUMENTS

| | | | |
|---|---|---|---|
| 2004/0114737 A1* | 6/2004 | MacConnell | H04L 12/12 379/106.03 |
| 2004/0116074 A1* | 6/2004 | Fujii | G06K 7/0008 455/41.2 |
| 2005/0143765 A1 | 6/2005 | Bachmann et al. | |
| 2008/0136648 A1* | 6/2008 | Endrikhovski | G06Q 10/087 340/572.8 |
| 2008/0143503 A1* | 6/2008 | Watabe | G01M 17/02 340/438 |
| 2008/0266106 A1 | 10/2008 | Lim et al. | |
| 2009/0002170 A1* | 1/2009 | Ishikawa | G06K 7/0008 340/572.1 |
| 2009/0236410 A1 | 9/2009 | Noda et al. | |
| 2010/0156651 A1 | 6/2010 | Broer | |
| 2010/0176948 A1* | 7/2010 | Garrett | H04B 5/00 340/572.1 |
| 2011/0046698 A1* | 2/2011 | Kivi | H04W 76/028 607/60 |
| 2011/0090063 A1* | 4/2011 | Koons | G06K 7/10009 340/10.33 |
| 2012/0088497 A1 | 4/2012 | Knapik et al. | |
| 2012/0267953 A1 | 10/2012 | Doyle | |
| 2013/0040567 A1* | 2/2013 | Matsubara | G06F 3/0488 455/41.1 |
| 2014/0266695 A1* | 9/2014 | Addison | A61B 5/7405 340/539.12 |

\* cited by examiner

MOBILE PROXIMITY COUPLING DEVICE

CLAIM FOR PRIORITY

The present application is a national stage filing under 35 U.S.C 371 of PCT application number PCT/EP2014/056313, having an international filing date of Mar. 28, 2014, which claims foreign priority to European Application Serial Number 13164818.0, filed Apr. 23, 2013, the disclosures of which are hereby incorporated by reference in their entireties.

The present invention relates to a mobile proximity coupling device and a method for inductive coupling.

An electronically readable identification document such as a passport or an identity card, or an electronically readable bank card or a credit card usually comprises an integrated circuit for authentication, identification or payment purposes.

The integrated circuit can represent a radio frequency identification chip (RFID), e.g. a near field communication chip (NFC), and can be passive. Radio frequency communications with the integrated circuit are usually performed upon the basis of an inductive coupling between a contactless coupling interface of the integrated circuit and a corresponding contactless interface of a proximity coupling device. The respective contactless interface and the communications can be realized according to the ISO/IEC14443 or ISO/IEC 7816-4 standard.

For border control, proximity coupling devices are usually stationary readers comprising a contactless interface for communicating with an integrated circuit of e.g. an electronically readable passport. Such readers are usually connected by wires with PCs via USB interfaces. Unfortunately, such border control readers are too expensive for other purposes than border control, in particular for mass purposes such as electronic payments or distributed identification.

Nowadays, the increasing demand for RFID or NFC communications has led to increasingly equipping mobile communication devices such as smart phones, with contactless interfaces e.g. for eID or NFC applications. Furthermore, a quality of coupling between the corresponding contactless interfaces of a smart phone and e.g. a credit card is often non-optimal or not sufficient for data exchange. Furthermore, in a near field scenario, typical channel estimation approaches such as transmitting training sequences for establishing channel quality are hardly to employ due to a shared field environment between the devices.

It is therefore an object of the present invention to provide an efficient concept for determining a quality of coupling in a mobile environment between a mobile proximity device, such as a smart phone or a tablet and a proximity object such as electronically readable identity card or credit card.

This object is achieved by the features of the independent claims. Further embodiments are subject-matter of the dependent claims, the description and the figures.

The invention is based on the finding that the above object can be achieved when determining a quality measure indicating a field coupling between corresponding contactless interfaces of a mobile proximity device and a proximity object upon the basis of, e.g. by counting, a number of e.g. subsequently received answers transmitted by the proximity object in response to commands generated by the mobile proximity device.

According to a first aspect, the invention relates to a mobile proximity coupling device for inductive coupling with an integrated circuit, the integrated circuit comprising a coupling interface for inductive coupling, of a proximity object, the proximity coupling device comprising a contactless interface being configured to inductively transmit a first number of commands towards the integrated circuit, and, after transmitting a respective command, to wait for a reception of a dedicated answer to the respective command from the integrated circuit within a predetermined time interval; and a processor being configured to determine a quality indicator upon the basis of a second number of received dedicated answers to the first number of commands, the quality indicator indicating a quality of an inductive coupling between the contactless interface and the coupling interface of the integrated circuit.

The mobile proximity coupling device can operate as a master and the proximity object can operate as a slave. The inductive coupling can be realized by a magnetic field generated by the mobile proximity coupling device and, e.g. when energized, by the proximity object.

The contactless interface and the coupling interface can respectively be adopted for radio frequency communications, for example for near field communications (NFC) or for radio frequency identification communications (RFID). In this regard, the contactless interface and the coupling interface can respectively comprise an antenna for generating a magnetic field for inductive coupling or for communications to exchange data.

The mobile proximity coupling device and the proximity object, in particular the contactless interface and the coupling interface, can respectively be adopted for communications according to the ISO/IEC 14443 standard and/or the ISO/IEC7816-4 standard.

The predetermined time interval can be predetermined by a respective standard such as the ISO/IEC 14443 standard and/or the ISO/IEC7816-4 standard or set, e.g. 0.1 ms, 0.5 ms, 1 ms or 2 ms.

Alternatively or in addition to determining the quality indicator upon the basis of the first number of commands and the second number of answers, the contactless interface is configured to inductively detect a signal from the integrated circuit, wherein the processor is configured to determine the quality indicator upon the basis of a signal strength of the detected signal or a signal characteristic.

The signal can be induced by the proximity object at the mobile proximity coupling device. The signal can occupy e.g. a frequency side band and can appear in a current of the mobile proximity coupling device. The signal characteristic can be e.g. a modulation scheme of the signal as described in the publication EP2399221, which is fully incorporated herein by reference.

According to an embodiment, the mobile proximity coupling device acts as a master at least for the purpose of determining the quality indicator and/or the position of the mobile proximity coupling device relatively to the proximity object for improved communications with e.g. a reduced error or failure rate. The proximity object acts as a slave.

The mobile proximity coupling device can, however, act for other purposes than determining the respective quality indicator as a slave and the proximity object—e.g. another mobile proximity coupling device or a reader—as a master. This is, by way of example, a scenario in electronic wallet applications where the mobile proximity coupling device electronically emulates e.g. a credit card or an identification document such as a driving license or a passport. However, for the purpose of determining the right position with an improved quality of coupling, the mobile proximity coupling device may temporarily switch into a master mode and the proximity object may temporarily switch into a slave mode. However, the coupling quality can also be determined by the other proximity coupling device, e.g. by a reader or by another smartphone.

According to an embodiment, the contactless interface is configured to successively transmit the first number of commands, and wherein the processor is configured to determine the quality indicator depending upon the second number of successively received dedicated answers. The first number of successive commands can be 10, by way of example.

According to an embodiment, the processor is configured to determine the quality indicator to indicate a sufficient quality of the inductive coupling if the second number of successively received dedicated answers reaches a predetermined threshold, or to indicate an insufficient quality of the inductive coupling if the second number of successively received dedicated answers is smaller than a predetermined threshold.

The predetermined threshold can be equal to the first number of transmitted commands. In other words, the quality may be considered as sufficient when each transmission of a command is followed by a reception of an answer to that command.

If the quality is sufficient then a communication can be established between the mobile proximity coupling device and the proximity object for data exchange or a further quality indicator can be determined in a multiple stage quality determination scheme.

According to an embodiment, the contactless interface is configured to vary or to reduce a time interval between subsequent commands. This can be accomplished by e.g. varying or reducing a time interval between deactivation of a magnetic field and transmitting a subsequent command after a re-activation of the magnetic field.

Hereby, the contactless interface can be controlled by the processor. By reducing the time interval between subsequent commands, the proximity object is forced to more quickly respond or answer to the respective command. If the coupling quality is sufficient then the time interval reduction does not cause a decrease of the second number of answers.

According to an embodiment, the contactless interface is configured to activate a magnetic field for powering or energizing the integrated circuit.

The proximity object, in particular the integrated circuit of proximity object, can be passive or can comprise a passive transponder. Therefore, e.g. for communications, the integrated circuit is powered by the mobile proximity coupling device.

According to an embodiment, the contactless interface is configured to deactivate the magnetic field after transmission of each command and to activate the magnetic field for transmitting each subsequent command.

Thereby, energizing the integrated circuit of the proximity object is interrupted between two subsequently transmitted commands. The subsequent activation of the magnetic field powers and thereby starts-up or boots or recovers the integrated circuit. If the quality of inductive coupling is insufficient then the integrated circuit cannot fully start up to respond to the command within the predetermined time interval. If the quality of inductive coupling is sufficient then the integrated circuit can fully start up, receive a command and respond thereto by generating an answer.

According to an embodiment, the contactless interface is configured to vary or to adjust or to reduce an activating time interval between an activation of the magnetic field and a subsequent transmission of a command.

At the time instant of the activation of the magnetic field, the integrated circuit receives power enabling the integrated circuit to recover or to boot. If the quality of inductive coupling is sufficient then the integrated circuit may boot or recover faster than in case of an insufficient quality of inductive coupling. The variation of the activation time interval can be probabilistic or deterministic, following a predetermined scheme, e.g. reducing duration of a subsequent activation time interval until an error, e.g. a missed answer to a transmitted command, occurs.

According to an embodiment, the contactless interface is configured, after or before transmitting the first number of commands,
  to inductively transmit a further first number of commands towards the integrated circuit, and, after transmitting a respective command,
  to wait for a reception of a dedicated answer to the respective command from the integrated circuit within the predetermined time interval,
  to deactivate the magnetic field after transmission of each command and to activate the magnetic field for transmitting each subsequent command, and
  to vary or to adjust or to reduce a duration of an activating time interval between an activation of the magnetic field and a subsequent transmission of a command, and
wherein the processor is configured to determine a further quality indicator upon the basis of a second number of subsequently received dedicated answers to the further first number of commands, the further quality indicator further indicating a quality of an inductive coupling between the contactless interface and the coupling interface of the integrated circuit.

Thereby, a multiple stage quality determination scheme can be realized, wherein the quality indicator and the further quality indicator collectively indicate the quality of inductive coupling. If the quality indicator indicates a sufficient quality of inductive coupling then, in a next stage, the further quality indicator can be determined to even more accurately test the quality of inductive coupling. If the further indicator indicates a sufficient quality of inductive coupling then a communication between the mobile proximity coupling device and the proximity object can be established. The same applies when the further quality indicator is determined before the quality indicator. In either case, before exchanging data between the mobile proximity coupling device and the proximity object, the magnetic field can be deactivated and activated again.

According to an embodiment, the contactless interface is configured, after or before transmitting the first number of commands,
  to repeatedly transmit a predetermined command towards the integrated circuit, and, after transmitting each predetermined command,
  to wait for a reception of a further dedicated answer to the respective predetermined command from the integrated circuit within the predetermined time interval, and
wherein the processor is configured to determine a further quality indicator to indicate an sufficient quality of the inductive coupling if a second number of successively received further dedicated answers reaches a predetermined threshold, or to indicate an insufficient quality of the inductive coupling a second number of successively received further dedicated answers is smaller than a predetermined threshold.

The predetermined command can be a command forcing a certain action from the integrated circuit other than transmitting an answer. Such action can be e.g. to mute or to idle.

With reference to the ISO/IEC 14443 standard and/or the ISO/IEC7816-4 standard, the proximity object can be a type A card. In this case, the predetermined command can be a command addressing a type B card. The type A card mutes when receiving a type B card command, thereby consuming energy. The same applies vice versa for a type B card and a type A command. If the quality of field coupling or field strength is insufficient then the integrated circuit cannot re-energize as quick as with sufficient quality of coupling, which may negatively affect the second number of answers. Thereby, the quality of coupling can be measured without deactivating the magnetic field between subsequent commands.

According to an embodiment, the respective quality indicator indicates either a sufficient quality, in particular a first flag or a first value, of the inductive coupling or an insufficient quality, in particular a second flag or a second value, of the inductive coupling for a communication between the contactless interface and the integrated circuit.

The respective flag can be set by setting or not setting a bit. As a flag, the respective quality indicator is of a type "yes" (sufficient quality) and "no" (insufficient quality). The first value can be e.g. a value between 5 and 10, and the second value can be a value between 1 and 5.

According to an embodiment, the respective command is a wake-up command or a request command, e.g. according to the ISO/IEC 14443-3 Standard and/or the ISO/IEC7816-4 standard.

According to an embodiment, the contactless interface comprises an inductive element to generate a magnetic field for transmitting a command and/or for energizing the integrated circuit.

According to an embodiment, the mobile proximity coupling device further comprises a display for displaying a desired change of position of the mobile proximity coupling device relatively to the proximity object if the quality indicator indicates an insufficient quality of the inductive coupling.

Thereby, a user can efficiently be supported in positioning the mobile proximity coupling device relatively to the proximity object, or vice versa, to achieve an improved quality of coupling and thus to reduce communication errors when communicating with the proximity object.

According to an embodiment, in order to display the desired position, the display is configured to display:
  a displacement of the mobile proximity coupling device relatively to the proximity object if the quality indicator indicates an insufficient quality of the inductive coupling; and/or
  a further position of the mobile proximity coupling device relatively to the proximity object if the quality indicator indicates an insufficient quality of the inductive coupling; and/or
  a movement direction for moving the proximity object relatively to the mobile proximity coupling device if the quality indicator indicates an insufficient quality of the inductive coupling; and/or
  another position of the proximity object.

In order to display the displacement, the display can indicate that a displacement is desired to achieve a better quality of coupling. The displacement and/or the other position and/or the movement direction can be indicated e.g. by an arrow or by a geometric pattern such as a rectangle representing the proximity object at another position. The other position of the proximity object can be indicated by displaying a contour of the proximity object at the display at the other position.

According to an embodiment, the processor is configured to determine the desired change of position upon the basis of the quality indicator.

If the quality indicator indicates an insufficient quality then the processor can determine to change the position of the mobile proximity coupling device relatively to the proximity object in order to obtain an improved inductive coupling.

According to an embodiment, the processor is configured to determine the desired change of position upon the basis of a predetermined relationship between positions of the coupling interface of the integrated circuit relatively to the contactless interface and qualities of inductive coupling.

The predetermined relationship can be stored in a look-up table. The relationship can be derived from measurements of coupling qualities for different coupling interfaces at different positions. These measurements can be pre-stored as characteristic curves forming the relationship.

According to an embodiment, the processor is configured, in order to determine the desired change of position, to determine:
  a displacement of the mobile proximity coupling device relatively to the proximity object if the quality indicator indicates an insufficient quality of the inductive coupling;
  a further position of the mobile proximity coupling device relatively to the proximity object if the quality indicator indicates an insufficient quality of the inductive coupling; or
  a movement direction for moving the proximity object relatively to the mobile proximity coupling device if the quality indicator indicates an insufficient quality of the inductive coupling; or
  another position of the proximity object.

The respective other position can be determined upon the basis of the aforementioned predetermined relationship between positions of the coupling interface of the integrated circuit relatively to the contactless interface and qualities of inductive coupling.

According to an embodiment, the respective quality indicator can be displayed on the display to visualize the quality of inductive coupling e.g. at the current position of the mobile proximity coupling device relatively to the proximity object. The quality indicator can be displayed as a quality bar to indicate e.g. a sufficient or an insufficient quality.

According to an embodiment, the contactless interface is configured for inductive coupling with the coupling interface at a first position of the coupling interface of the integrated circuit relatively to the contactless interface; wherein the processor is configured to determine the quality indicator indicating the quality of the inductive coupling at the first position; wherein the display is configured to display the desired change of position of the mobile proximity coupling device relatively to the proximity object from the first position towards the second position if the quality indicator indicates an insufficient quality of the inductive coupling at the first position; wherein the processor is configured to determine a further quality indicator indicating a quality of the inductive coupling at the second position; and wherein the display is configured to display the desired change of position of the mobile proximity coupling device relatively to the proximity object if the further quality indicator indicates an insufficient quality of the inductive coupling at the second position.

Thereby, the position at which the quality of coupling is sufficient for communication can iteratively be determined by determining the respective quality indicator at different positions.

According to an embodiment, the contactless interface is configured, after or before transmitting the first number of commands at the second position, to inductively transmit a further first number of commands towards the integrated circuit, and, after transmitting a respective command, to wait for a reception of a dedicated answer to the respective command from the integrated circuit within the predetermined time interval, to deactivate the magnetic field after transmission of each command and to activate the magnetic field for transmitting each subsequent command, and to vary or to adjust or to reduce a duration of an activating time interval between an activation of the magnetic field and a subsequent transmission of a command, and wherein the processor is configured to determine a further quality indicator upon the basis of a second number of subsequently received dedicated answers to the further first number of commands, the further quality indicator further indicating a quality of an inductive coupling between the contactless interface and the coupling interface of the integrated circuit at the second position.

Thereby, the position at which the quality of coupling is sufficient for communication can iteratively be determined by determining the respective quality indicator at different positions.

According to an embodiment, the respective number of answers, in particular subsequent answers, directly determines the respective quality indicator.

According to an embodiment, the mobile proximity coupling device is a mobile communication device, in particular a smart phone or a tablet.

According to an embodiment, the proximity object is one of the following objects comprising the integrated circuit: an identification document or a credit card or a bank card or another mobile proximity coupling device, such as smart phone or a reader.

According to an aspect, the invention relates to a method for determining a quality of an inductive coupling between an integrated circuit of a proximity object, the integrated circuit comprising a coupling interface for inductive coupling, and a mobile proximity coupling device comprising a contactless interface for inductively communicating with the coupling interface of an integrated circuit, the method comprising: inductively transmitting a first number of commands towards the integrated circuit; after transmitting a respective command, waiting for a reception of a dedicated answer to the respective command from the integrated circuit within a predetermined time interval; and determining a quality indicator upon the basis of a second number of received dedicated answers to the first number of commands, the quality indicator indicating a quality of an inductive coupling between the contactless interface and the coupling interface of the integrated circuit.

According to an embodiment, the method further comprises displaying a desired change of position of the mobile proximity coupling device relatively to the proximity object if the quality indicator indicates an insufficient quality of the inductive coupling.

The method can be implemented on and/or executed by the mobile proximity coupling device.

According to an aspect, the invention relates to a method for positioning a mobile proximity coupling device relatively to a proximity object comprising an integrated circuit, the integrated circuit comprising a coupling interface for inductive coupling, the proximity coupling device comprising a contactless interface for inductive coupling with the coupling interface of the integrated circuit and a display, the method comprising: determining a quality indicator indicating a quality of the inductive coupling; and displaying a desired change of position of the mobile proximity coupling device relatively to the proximity object if the quality indicator indicates an insufficient quality of the inductive coupling.

The method can be implemented on and/or executed by the mobile proximity coupling device.

According to an aspect, the invention relates to a computer program for performing the method when executed on a computer.

The computer program can be implemented on and/or executed by the mobile proximity coupling device.

Figure 2:
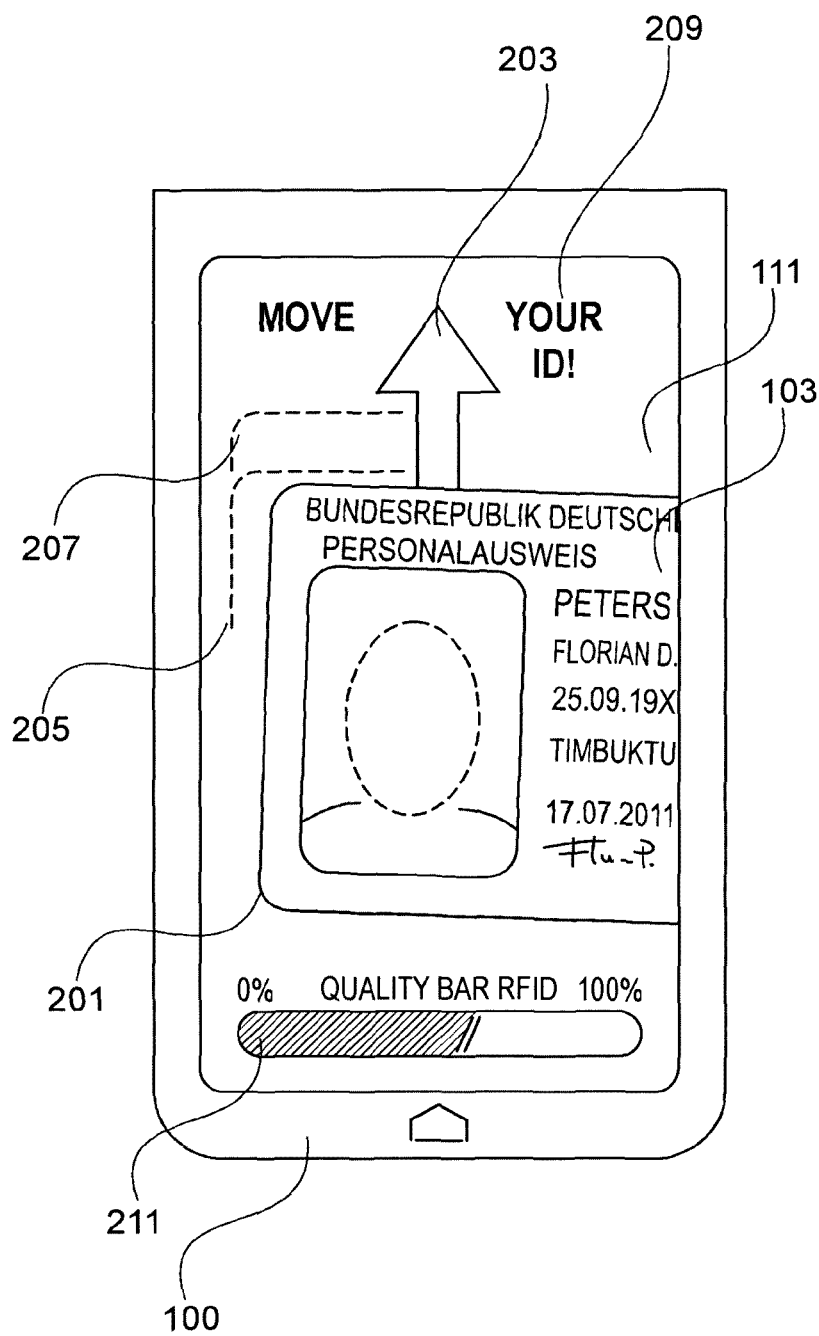

Further embodiments will be described in the following with respect to the following figures, in which:

FIG. 1 a mobile proximity coupling device;

FIG. 2 the mobile proximity coupling device; and

Figure 3:
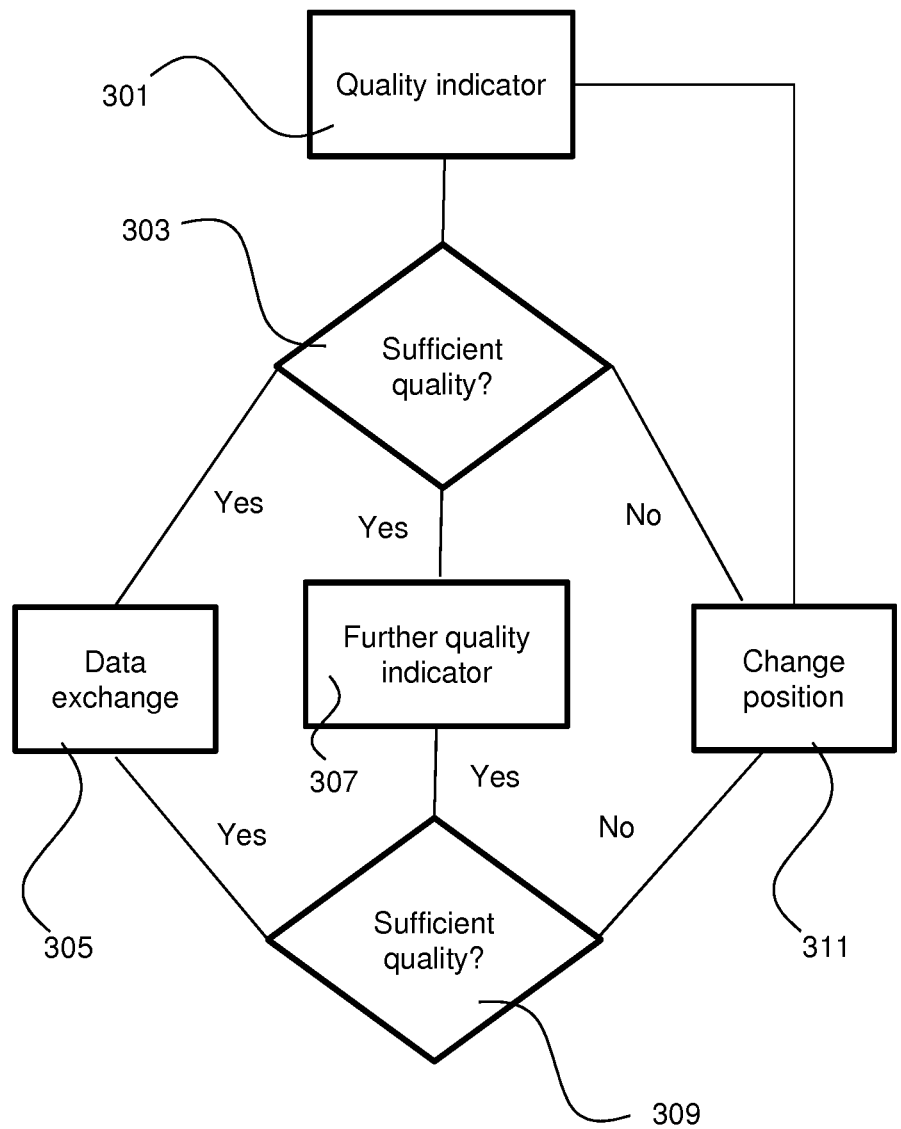

FIG. 3 a diagram of a method.

FIG. 1 shows a mobile proximity coupling device 100 for inductive coupling with an integrated circuit 101 of a proximity object 103, the integrated circuit 101 comprising a coupling interface 105 for inductive coupling. The proximity object 103 is not an element of the mobile proximity coupling device 100.

The mobile proximity coupling device 100 comprises a contactless interface 107 for inductive coupling denoted by the arrow 108 with the coupling interface 105 of the integrated circuit 101, and processor 109 for determining a quality indicator indicating a quality of the inductive coupling. The processor 109 is connected to the contactless interface 107.

The contactless interface 107 and the coupling interface 105 can both be contactless, coupling interfaces for radio frequency coupling, in particular for near field coupling. Each interface can have an antenna for sensing magnetic field.

For the sake of description, the term "contactless interface" denotes the contactless coupling interface 107 of the mobile proximity coupling device 100 and the term "coupling interface" denotes the contactless coupling interface 105 of the proximity object 103.

The contactless interface 107 and the coupling interface 105 can be a part of or can be formed by an RFID chip or NFC chip.

The proximity coupling device 100 optionally comprises a display 111 for displaying a desired change of position of the mobile proximity coupling device 100 relatively to the proximity object 101 if the quality indicator indicates an insufficient quality of the inductive coupling.

The mobile proximity coupling device 100 and the proximity object 103 can communicate according to the ISO/IEC14443 or ISO/IEC 7816-4 standard.

According to an embodiment, the quality indicator indicates either a sufficient quality, in particular a first flag or value, or the insufficient quality, in particular a second flag or value.

In order to determine the quality indicator, according to an embodiment, the contactless interface 107 is configured to detect a signal from the integrated circuit 101, wherein the processor 109 is configured to determine the quality indicator upon the basis of a signal strength of the detected signal or a signal characteristic. Such signal can be induced due to the inductive coupling 108 in the contactless interface 107 by the coupling interface 105.

In order to determine the quality indicator, according to an embodiment, the contactless interface 107 is configured to inductively transmit a first number of commands towards the integrated circuit 101, and, after transmitting a respective command, to wait for a reception of a dedicated answer to the respective command from the integrated circuit 101 within a predetermined time interval. If a respective dedicated answer to a particular command has been received then the contactless interface 107 can stop waiting and transmit a subsequent command. However, the contactless interface 107 can wait until the expiry of the predetermined time interval.

The processor 109 can be configured to determine a quality indicator upon the basis of a second number of received dedicated answers to the first number of commands, the quality indicator indicating a quality of an inductive coupling between the contactless interface and the coupling interface of the integrated circuit.

The respective transmitted command can e.g. be REQA for type A proximity objects or REQB for type B proximity objects or WUPA for type A proximity objects or WUPB for type B proximity objects according to the ISO/IEC 14443 standard. A time interval between subsequent commands can be fix or variable. The received answers, in particular the second number of subsequently received answers, indicates according to an embodiment the quality of coupling.

According to an embodiment, the integrated circuit 101 is a passive circuit. Therefore, the contactless interface 107 can be configured to activate a magnetic field for powering the integrated circuit 101.

According to an embodiment, the contactless interface 107 is configured, for determining the quality indicator, to deactivate the magnetic field after transmission of each command and to activate the magnetic field for transmitting each subsequent command. In particular, the contactless interface 107 can be configured to vary or to adjust or to reduce an activating time interval between an activation of the magnetic field and a subsequent transmission of a command. Thereby, an effective boot time of the integrated circuit 107 can be monitored. The boot time depends on the amount of power or energy transferred towards the integrated circuit 107. In case of an insufficient coupling quality the boot time can even be longer then the predetermined time interval so that an answer from the proximity object 103 cannot be received. In this case, the quality indicator may indicate an insufficient coupling quality.

According to an embodiment, the processor 109 can be configured to determine the quality indicator upon the basis of the second number of successively received dedicated answers to the first number of commands. If the second number equals to a threshold, e.g. 90% or 100% of the first number then the processor 109 can determine the quality indicator indicating a sufficient quality of coupling. Such quality indicator can be represented by the bit "1" or by a number indicating a percentage of the second number in relation to the first number.

Otherwise, the quality indicator indicates insufficient quality which can be expressed by a logical "0" or by another number indicating a percentage of the second number in relation to the first number.

If the quality indicator indicates an insufficient quality, then the processor 109 can generate a signal indicating a desired change the position between the mobile proximity coupling device 100 and the proximity object 103. The change of position signal can be displayed by the display 111 or otherwise indicated. At another position, the above described procedure can be executed again to obtain a new quality indicator at the other position. Thus, the quality indicator described above can already be evaluated to decide whether to exchange data between the mobile proximity coupling device 100 and the proximity object 103.

If the quality indicator indicates a sufficient quality then the processor 109 can, according to an embodiment, initiate a data exchange between the mobile proximity coupling device 100 and the proximity object 103.

However, according to an embodiment, the process of qualifying the quality of coupling for data exchange can be two-stage, wherein the above described approaches can be executed one after another.

In a first stage, the contactless interface 107 can be configured to successively transmit the first number of commands towards the integrated circuit 101, and, after transmitting a respective command, to wait for a reception of a dedicated answer to the respective command from the integrated circuit 101 within the predetermined time interval. The first number can equal to 10.

Correspondingly, the processor 109 can be configured to determine the quality indicator upon the basis of a second number of successively received dedicated answers to the first number of commands.

If the second number equals to a threshold, e.g. 90% or 100% of the first number then the processor 109 can determine the quality indicator indicating a sufficient quality of coupling. Such quality indicator can be represented by the bit "1" or by a number indicating a percentage of the second number in relation to the first number.

If the quality indicator indicates a sufficient quality then, in a second stage, a further quality indicator can be determine to even more reliably qualify the quality of coupling for data exchange. In the second stage, the contactless interface 107 can deactivate a magnetic field powering the integrated circuit 101 and activate the magnetic field between subsequently transmitted further commands of a further first number of commands. The commands can correspond to the commands described above and can be, e.g. wake-up commands, and the further first number can equal the first number mentioned above.

Furthermore, the contactless interface 107 can be configured to vary or to adjust or to reduce a duration of an activating time interval between an activation of the magnetic field and a subsequent transmission of a command.

Accordingly, the processor 109 is configured to determine the further quality indicator upon the basis of a second number of subsequently received dedicated answers to the further first number of commands.

If the further second number equals to a threshold, e.g. 90% or 100% of the further first number then the processor 109 can determine the further quality indicator indicating a sufficient quality of coupling. Such quality indicator can be represented by the bit "1" or by a number indicating a percentage of the second number in relation to the first number. In this case, the processor 109 can initiate a date exchange between the mobile proximity coupling device 100 and the proximity object 103.

Otherwise, if the further quality indicator indicates an insufficient quality, then the processor 109 can generate a signal indicating a desired change the position between the mobile proximity coupling device 100 and the proximity object 103. The change of position signal can be displayed by the display 111 or otherwise indicated. At another position, the above described procedure can be executed again to obtain a new quality indicator at the other position.

In order to indicate the desired change of relative position between the mobile proximity coupling device 100 and the proximity object 103, a desired displacement of the mobile proximity coupling device 100 relatively to the proximity object 103 and/or a further position of the mobile proximity coupling device 100 relatively to the proximity object 103 and/or a movement direction for moving the proximity object 103 relatively to the mobile proximity coupling device 100 (or vice versa) and/or another position of the proximity object 103 can be displayed, e.g. by displaying an arrow towards the other position and/or a schematic contour of the proximity object 103 at the other position According to an embodiment, the other position can be determined by the processor 109 upon the basis of predetermined, e.g. pre-stored, different relative positions associated with different qualities of coupling. Therefore, the processor 109 can directly determine the other position with an expected improvement of the quality of coupling for data exchange.

According to an embodiment, the mobile proximity coupling device 100 acts as a master at least for the purpose of determining the respective quality indicator and/or the position of the mobile proximity coupling device 100 relatively to the proximity object 103. The proximity object 103 acts as a slave.

The mobile proximity coupling device 100 can act for other purposes than determining the quality indicator as a slave and the proximity object 10, e.g. another mobile proximity coupling device or a reader, as a master. This can be advantageous e.g. in mobile payment or electronic wallet applications where the mobile proximity coupling device 100 electronically emulates e.g. a credit card. However, for the purpose of determining the right position with an improved quality of coupling, the mobile proximity coupling device 100 may also temporarily switch into a master mode and the proximity object may temporarily switch into a slave mode.

The mobile proximity coupling device 100 can be e.g. a mobile reader or a smart phone or a tablet. Correspondingly, the proximity object 103 can be an identification document or a credit card or a bank card or even another mobile proximity coupling device.

FIG. 2 shows the mobile proximity coupling device 100 displaying the desired change of position of the mobile proximity coupling device 100 with respect to the proximity object 103.

According to an embodiment, the mobile proximity coupling device 100 can comprise an optical camera on a back of the mobile proximity coupling device 100. The mobile camera can capture a picture of the proximity object 103, and, optionally, to display its current position 201.

However, according to an embodiment, the proximity object 103 can be directly positioned on the mobile proximity coupling device 100.

In order to display the desired change of position, the display 111 can depict an arrow 203 pointing towards another position of the mobile proximity coupling device 100 with respect to the proximity object 103.

In order to display the desired change of position, the display 111 can depict at least a contour 205 or the proximity object, or a sequence of contours 205, 207 of the proximity object 103 pointing towards the other position of the mobile proximity coupling device 100 with respect to the proximity object 103.

According to an embodiment, the display 111 can also display a request 209 to change the position of the mobile proximity coupling device 100 with respect to the proximity object 103.

According to an embodiment, the display 111 can also display a quality bar 111 indicating the current quality of inductive coupling. The quality bar 111 can directly or in a weighted manner indicate a current value of the quality indicator.

According to an embodiment, a user can move the mobile proximity coupling device 100 relatively to the proximity object 103 or vice versa. In this regard, the user may be prompted, after e.g. optically capturing printed or written data of an identity card, to put the proximity object 103 onto the mobile proximity coupling device 100, e.g. at a certain angle.

Thereafter, the respective quality indicator can be determined, whereby the user can be prompted to move the proximity object 103 e.g. away from the approximate position captured during the optical reading towards another position when the coupling quality is insufficient.

The full functionality of the proximity object 103 can be activated for data exchange when the respective quality indicates a sufficient coupling quality.

Furthermore, according to an embodiment, if a sufficient quality cannot be determined at different positions then the user may be prompted to remove a cover covering the smart phone forming an embodiment of the mobile proximity coupling device 100. Furthermore, the user can be prompted to charge a battery of the mobile proximity coupling device 100 in case of a weak inductive coupling.

According to an embodiment, the user can be prompted not to change a position of the mobile proximity coupling device 100 with respect to the proximity object 103 when determining the respective quality indicator and/or when exchanging data.

FIG. 3 shows a diagram of a method 300 exemplarily depicting the above described embodiments. It is, however, to be understood that each embodiment forms, independently of jointly with any other embodiment, an embodiment of the invention.

The method shown in FIG. 3 comprises determining 301 the quality indicator as described above upon the basis of a transmission of the first number of commands and the reception of the second number of commands.

If the quality indicator indicates a sufficient quality in a step 303, then, according to an embodiment, a data exchange 305 between the mobile proximity coupling device 100 and the proximity object 103 can be initiated.

If the quality indicator indicates a sufficient quality in the step 303, then, according to another embodiment, the two-stage procedure can be performed, with determining 307 the further quality indicator upon the basis of a transmission of the further first number of commands and the reception of the further second number of commands.

If the further quality indicator indicates a sufficient quality in a step 309, then the data exchange 305 between the mobile proximity coupling device 100 and the proximity object 103 can be initiated.

In order to initiate the data exchange, the magnetic field powering the proximity object 103 can be switched off, i.e. deactivated, and activated again.

If either the quality indicator or the further quality indicator is found in steps 303, 307 to be insufficient, then a desired change of position between the mobile proximity coupling device 100 and the proximity object 103 can be displayed in step 311. Thereafter, the method is executed again starting with determining 301 the quality indicator.

The method 300 can be executed by the mobile proximity coupling device 100.

The description, the claims and the drawings are directed to inductive coupling as an embodiment of a field coupling. However, embodiments described herein also apply for a capacitive coupling as another embodiment of a field coupling. In this case, the inductive elements for field coupling can be replaced by electrodes.

The invention claimed is:

1. Mobile proximity coupling device for inductive coupling with an integrated circuit of a proximity object, the integrated circuit comprising a coupling interface for inductive coupling, the proximity coupling device comprising:
 a contactless interface being configured to inductively transmit a first number of commands towards the integrated circuit, and, after transmitting a respective command, to wait for a reception of a first number of dedicated answer to the respective command from the integrated circuit within a predetermined time interval; and
 a processor being configured to determine a quality indicator upon the basis of a second number of received dedicated answers to the first number of commands, the quality indicator indicating a quality of an inductive coupling between the contactless interface and the coupling interface of the integrated circuit,
 wherein the processor is configured to determine the quality indicator (i) to indicate a sufficient quality of the inductive coupling if the second number of successively received dedicated answers reaches a predetermined threshold, or (ii) to indicate an insufficient quality of the inductive coupling if the second number of successively received dedicated answers is smaller than a predetermined threshold.

2. The mobile proximity coupling device of claim 1, wherein the contactless interface is configured to successively transmit the first number of commands, and wherein the processor is configured to determine the quality indicator depending upon the second number of successively received dedicated answers.

3. The mobile proximity coupling device of claim 1, wherein the contactless interface is configured to vary or to reduce the predetermined time interval between subsequent commands.

4. The mobile proximity coupling device of claim 1, wherein the contactless interface is configured to activate a magnetic field for powering the integrated circuit.

5. The mobile proximity coupling device of claim 4, wherein the magnetic field is activated after transmission of each command and to activate the magnetic field for transmitting each subsequent command.

6. The mobile proximity coupling device of claim 4, wherein the contactless interface is configured to adjust an activating time interval between an activation of the magnetic field and a subsequent transmission of a command in the first number of commands.

7. The mobile proximity coupling device of claim 4, wherein the contactless interface is configured, after or before transmitting the first number of commands,
 to inductively transmit a further first number of commands towards the integrated circuit, and, after transmitting a respective command,
 to wait for a reception of a further first number of dedicated answer to the respective command from the integrated circuit within the predetermined time interval,
 to deactivate the magnetic field after transmission of each command, in the further first number of commands, and to activate the magnetic field for transmitting each subsequent command, in the further first number of commands, and
 to adjust a duration of an activating time interval between an activation of the magnetic field and a subsequent transmission of a command, and
 wherein the processor is configured to determine a further quality indicator upon the basis of a second number of subsequently received dedicated answers to the further first number of commands, the further quality indicator further indicating a quality of an inductive coupling between the contactless interface and the coupling interface of the integrated circuit.

8. The mobile proximity coupling device of claim 1, wherein the contactless interface is configured, after or before transmitting the first number of commands,
 to repeatedly transmit a predetermined command towards the integrated circuit, and, after transmitting each predetermined command,
 to wait for a reception of a further first number of dedicated answer to the respective predetermined command from the integrated circuit within the predetermined time interval, and
 wherein the processor is configured to determine a further quality indicator (i) to indicate an sufficient quality of the inductive coupling if a second number of successively received further dedicated answers reaches a predetermined threshold, or (ii) to indicate an insufficient quality of the inductive coupling if a second number of successively received further dedicated answers is smaller than a predetermined threshold.

9. The mobile proximity coupling device of claim 1, wherein the respective quality indicator indicates either (i) a sufficient quality of the inductive coupling or (ii) an insufficient quality of the inductive coupling for a communication between the contactless interface and the integrated circuit.

10. The mobile proximity coupling device of claim 1, wherein the respective command is one of a wake-up command and a request command.

11. The mobile proximity coupling device of claim 1, further comprising a display for displaying a desired change of position of the mobile proximity coupling device relatively to the proximity object if the quality indicator indicates an insufficient quality of the inductive coupling.

12. The mobile proximity coupling device of claim 11, wherein the processor is configured to determine the desired change of position upon the basis of a predetermined relationship between positions of the coupling interface of the integrated circuit relatively to the contactless interface and qualities of inductive coupling.

13. The mobile proximity coupling device of claim 11, wherein the contactless interface is configured for inductive coupling with the coupling interface at a first position of the coupling interface of the integrated circuit relatively to the contactless interface;
 wherein the processor is configured to determine the quality indicator indicating the quality of the inductive coupling at the first position;
 wherein the display is configured to display the desired change of position of the mobile proximity coupling device relatively to the proximity object from the first position towards the second position if the quality indicator indicates an insufficient quality of the inductive coupling at the first position; wherein the processor is configured to determine a further quality indicator indicating a quality of the inductive coupling at the second position; and wherein the display is configured to display the desired change of position of the mobile proximity coupling device relatively to the proximity object if the further quality indicator indicates an insufficient quality of the inductive coupling at the second position.

14. The mobile proximity coupling device of claim 13, wherein, the contactless interface is configured, after or before transmitting the first number of commands at the second position, to inductively transmit a further first number of commands towards the integrated circuit, and, after transmitting a respective command, to wait for a reception of a further first number of dedicated answer to the respective command from the integrated circuit within the predetermined time interval, to deactivate the magnetic field after transmission of each command, in the further first number of commands, and to activate the magnetic field for transmitting each subsequent command, and to adjust a duration of an activating time interval between an activation of the magnetic field and a subsequent transmission of a command, and wherein the processor is configured to determine a further quality indicator upon the basis of a second number of subsequently received dedicated answers to the further first number of commands, the further quality indicator further indicating a quality of an inductive coupling between the contactless interface and the coupling interface of the integrated circuit at the second position.

15. The mobile proximity coupling device of claim 1, being a mobile communication device.

16. The mobile proximity coupling device of claim 1, wherein the proximity object is at least one of the following objects comprising the integrated circuit: an identification document, a credit card, a bank card, and another mobile proximity coupling device.

17. A method for determining a quality of an inductive coupling between an integrated circuit of a proximity object, the integrated circuit comprising a coupling interface for inductive coupling, and a mobile proximity coupling device comprising a contactless interface for inductively communicating with the coupling interface of an integrated circuit, the method comprising:

inductively transmitting a first number of commands towards the integrated circuit; after transmitting a respective command, waiting for a reception of a first number of dedicated answer to the respective command from the integrated circuit within a predetermined time interval; and determining a quality indicator upon the basis of a second number of received dedicated answers to the first number of commands, the quality indicator indicating a quality of an inductive coupling between the contactless interface and the coupling interface of the integrated circuit, wherein the step of determining the quality indicator is (i) to indicate a sufficient quality of the inductive coupling if the second number of successively received dedicated answers reaches a predetermined threshold, or (ii) to indicate an insufficient quality of the inductive coupling if the second number of successively received dedicated answers is smaller than a predetermined threshold.

18. The method of claim 17, further comprising displaying desired change of position of the mobile proximity coupling device relatively to the proximity object if the quality indicator indicates an insufficient quality of the inductive coupling.

19. A computer program for performing the method of claim 17 when executed on a computer.

* * * * *